US007378592B2

(12) United States Patent
Suzuki et al.

(10) Patent No.: US 7,378,592 B2
(45) Date of Patent: May 27, 2008

(54) PROTECTOR

(75) Inventors: Mitsuharu Suzuki, Tochigi (JP);
Shinntarou Suzuki, Tochigi (JP);
Shinji Sonda, Tochigi (JP); Hiroyuki Usui, Tochigi (JP); Yuuji Ishimura, Saitama (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/308,485

(22) Filed: Mar. 29, 2006

(65) Prior Publication Data
US 2006/0219423 A1 Oct. 5, 2006

(30) Foreign Application Priority Data
Mar. 29, 2005 (JP) ............................. 2005-096305
Nov. 29, 2005 (JP) ............................. 2005-343818

(51) Int. Cl.
*H02G 3/04* (2006.01)
(52) U.S. Cl. .................. 174/72 A; 174/135; 174/72 C; 174/68.1; 385/134; 385/135
(58) Field of Classification Search ............. 174/17 R, 174/480, 481, 50, 72 R, 72 A, 72 C, 68.1, 174/68.3, 96, 97, 98, 101, 135; 439/76.1, 439/76.2, 134, 135; 385/134, 135; 269/47, 269/48
See application file for complete search history.

(56) References Cited
U.S. PATENT DOCUMENTS 5,115,260 A * 5/1992 Hayward et al. ........... 385/100
5,338,014 A * 8/1994 Kitamura ..................... 269/47
5,534,665 A * 7/1996 Long ......................... 174/72 A
5,789,702 A * 8/1998 Perella ......................... 174/481
5,932,846 A * 8/1999 Zaguskin et al. .......... 174/70 R
6,049,040 A * 4/2000 Biles et al. ................. 174/68.3
6,126,123 A * 10/2000 Yang ......................... 248/74.1
6,344,611 B2 * 2/2002 Ewer et al. ................. 174/72 C
6,708,918 B2 * 3/2004 Ferris et al. ................. 385/135
6,972,368 B2 * 12/2005 VanderVelde .............. 174/492
7,109,420 B2 * 9/2006 Arai et al. ................. 174/72 A

FOREIGN PATENT DOCUMENTS
JP 2003070121 A 3/2003

\* cited by examiner

Primary Examiner—Angel R. Estrada
(74) Attorney, Agent, or Firm—Ronald E. Smith; Smith & Hopen, P.A.

(57) ABSTRACT

A protector for a wire harness. After the protector is placed onto and secured to a jig and the wire harness is wired, the wire harness will not become loose inside the protector even when the protector is removed from the jig. The protector comprises: a protector body that stores a plurality of wire harnesses, and a cover that closes off the opening section of the protector body, and boss(es), having pin holes in which jig pin(s) can be inserted, (is) are formed in the protector body. A plurality of wire harnesses are divided by the bosses as base points and guided to a plurality of guide openings that are formed on the outer edge of the protector body. The wire harnesses will not become loose inside the protector even when the protector is removed from the jig due to the bosses inside the protector.

6 Claims, 22 Drawing Sheets

PROTECTOR

CROSS REFERENCE TO RELATED APPLICATIONS

The present application claiming the benefit of prior filed Japanese Application Number 2005-096305, filed on Mar. 29, 2005 and Japanese Application Number 2005-343818, filed on Nov. 29, 2005.

BACKGROUND OF THE INVENTION

1. Field of the Invention

This invention relates to a protector, and more particularly to a protector that is employed when dividing a wire harness.

2. Description of the Related Art

Conventionally, technology has been provided in which in order to place and fasten the protector for a wire harness on a jig, holes were formed in the protector body and cover, and jig pins that were formed on the jig were inserted into the holes. (See patent document 1.)

[Patent Document 1]

Japanese patent publication No. 2003-70121

SUMMARY OF THE INVENTION

[Problems to be Solved by the Invention]

However, this technology had the following problems.

In the prior technology described above, jig pins were inserted into holes that were formed in the protector body and cover, so after wiring the wire harness, when the protector was removed from the jig, the jig pins no longer existed, so there was a problem in that the wire harness became loose inside the protector.

Taking into consideration the aforementioned problem, the object of this invention is to provide a technique that is capable of solving the problem.

[Means for Solving the Problems]

The protector of this invention includes a protector body that stores a plurality of wire harnesses, and a cover that closes off an opening section of the protector body; wherein said protector body and said cover are used for wiring said wiring harnesses and installed in order of said protector body and said cover to jig 50 comprising jig pins 51; at least one boss for positioning said wire harnesses bent around the at least one boss and divided from the at least one boss is formed in the position that corresponds to said jig pins 51 of said protector body; and a pinhole in which a jig pin 51 can be inserted is formed inside said at least one boss.

Moreover at least one boss hole in which said at least one boss can be inserted is formed in said cover.

The protector of this invention may include a plurality of bosses; at least one boss of the plurality of bosses has a different thickness than at least one of the other bosses.

The novel protector further includes a plurality of guide opening formed around the edge of said protector. The plurality of wire harnesses is divided from said plurality of bosses, and guided to said plurality of guide openings.

Engagement ribs are formed in said cover so as to face said bosses and the amount of wrap between said bosses and said engagement ribs exceeds the allowable fastening amount when installing said cover onto said protector body.

Wiring-support ribs are) formed near the top end of said bosses.

Also, downward sloping surface are formed on the top sections of said bosses.

Lubricant is applied to the top sections of said bosses.

[Effect of the Invention]

With this invention, bosses are located in the protector body, so even when the protector is removed from the jig, bosses are located inside so the wire harnesses do not become loose inside the protector.

DESCRIPTION OF SYMBOLS

1 Protector

10 Wire harness

Figure 1:
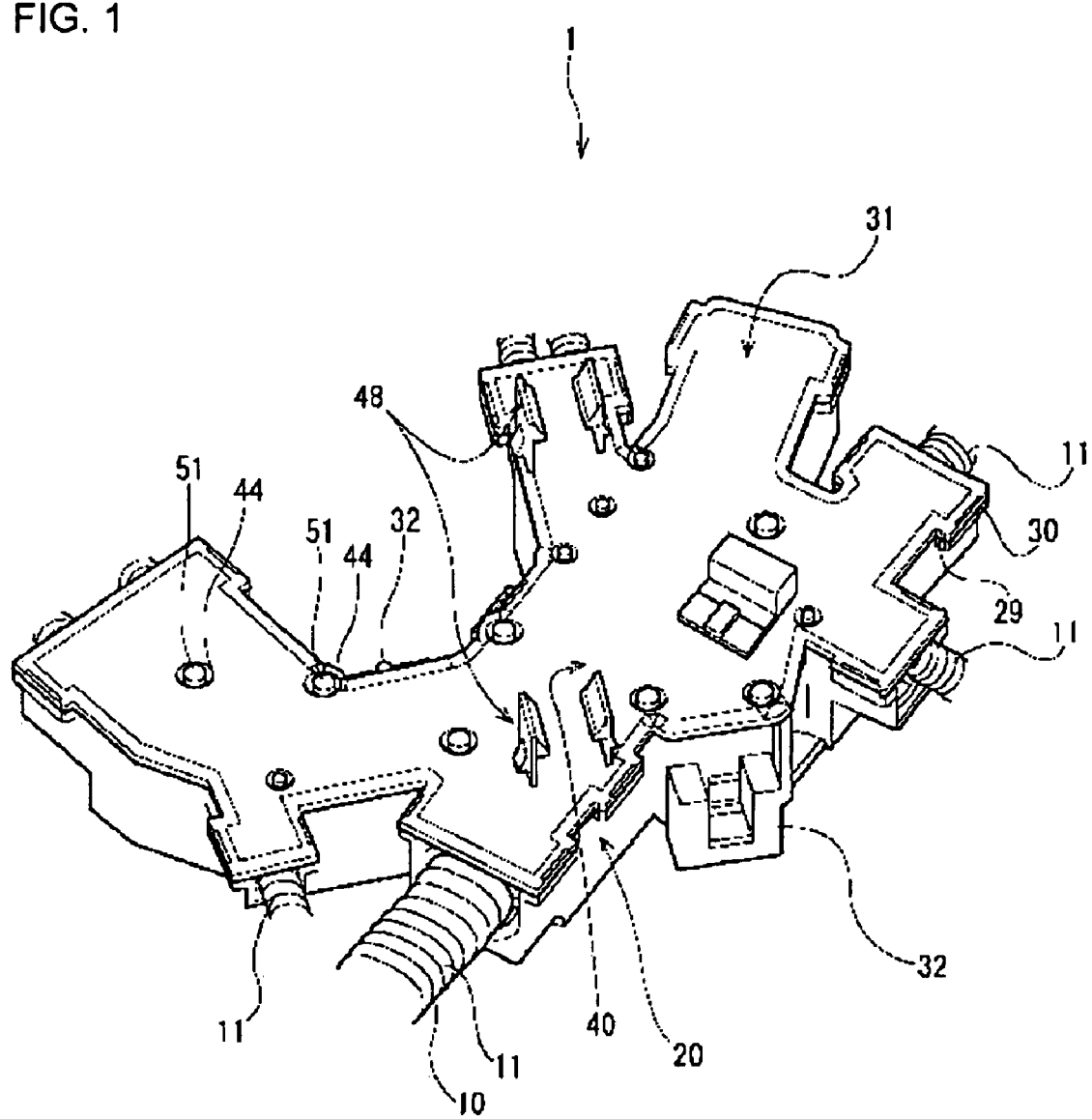
FIG. 1 is a pictorial drawing of the protector 1 of a first embodiment of the invention.
Figure 2:
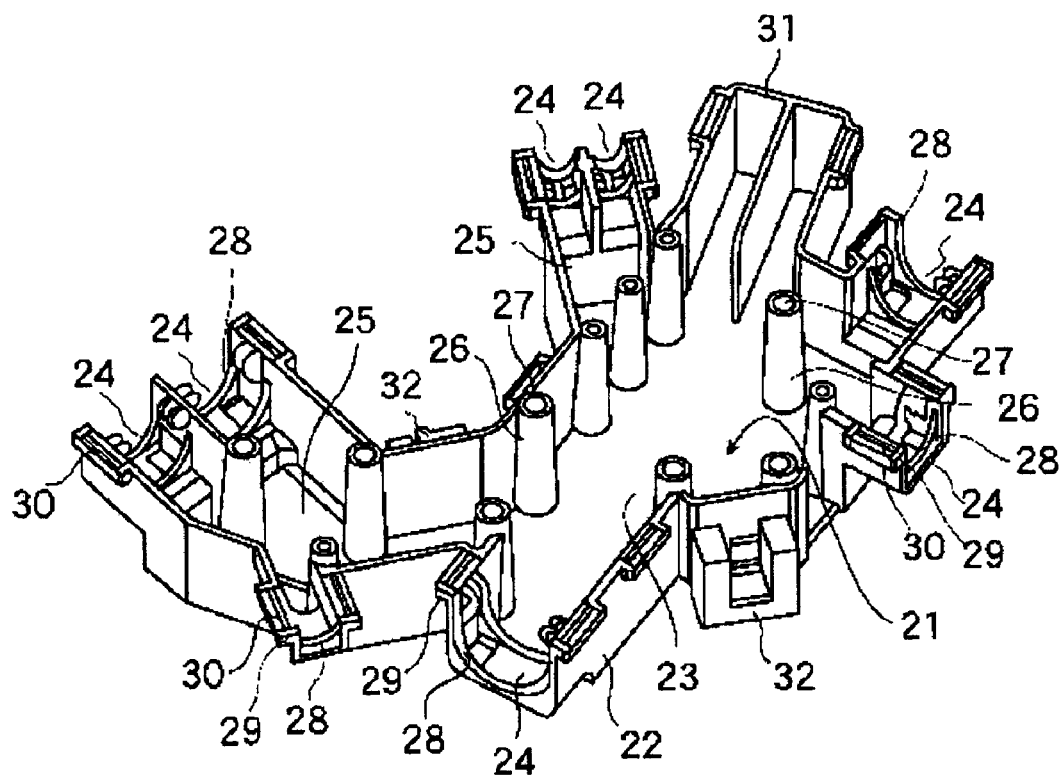
FIG. 2 is a pictorial drawing of the protector body 20 of the first embodiment of the invention.
Figure 3:
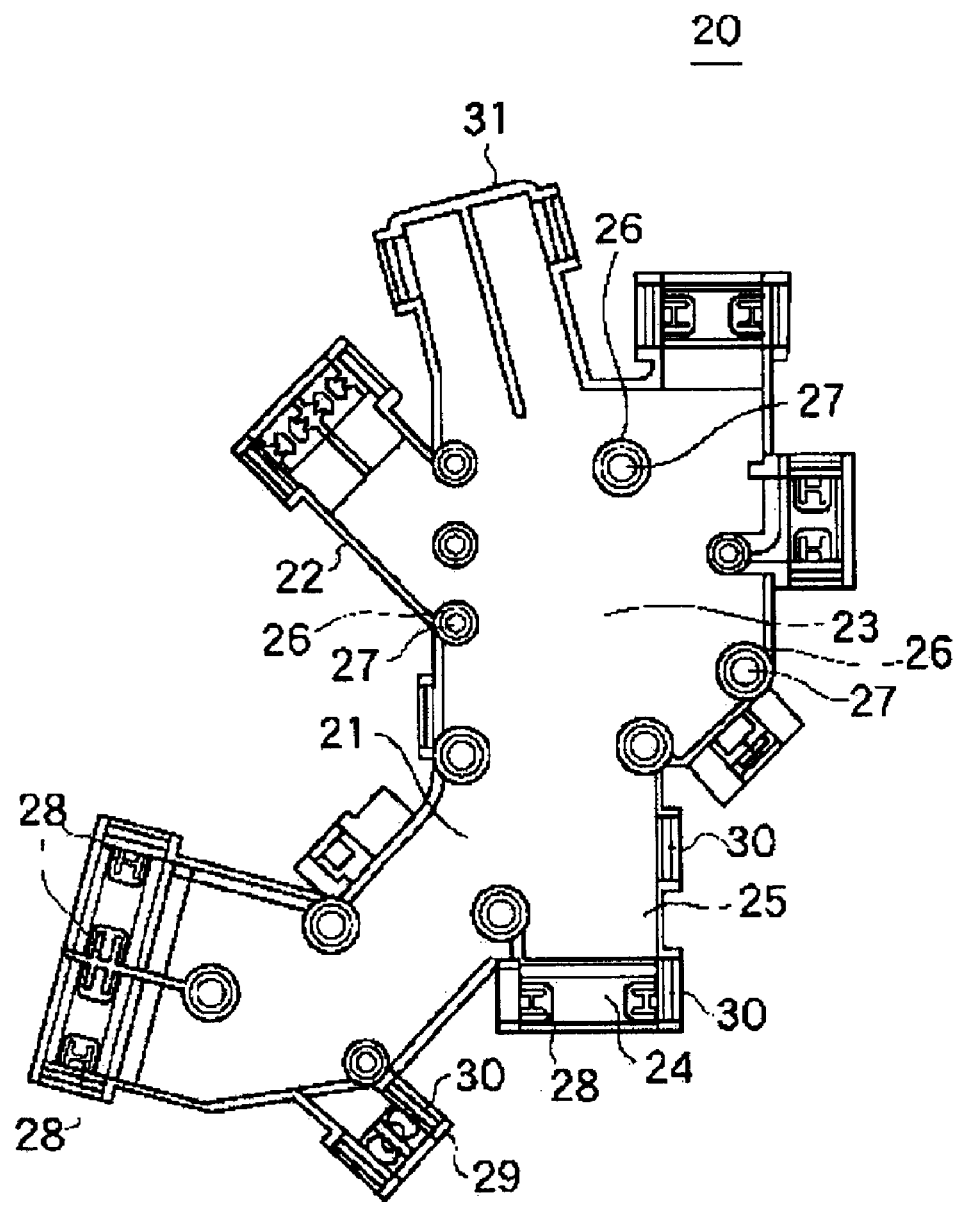
FIG. 3 is a top view of the protector body 20 of the first embodiment of the invention.
Figure 4:
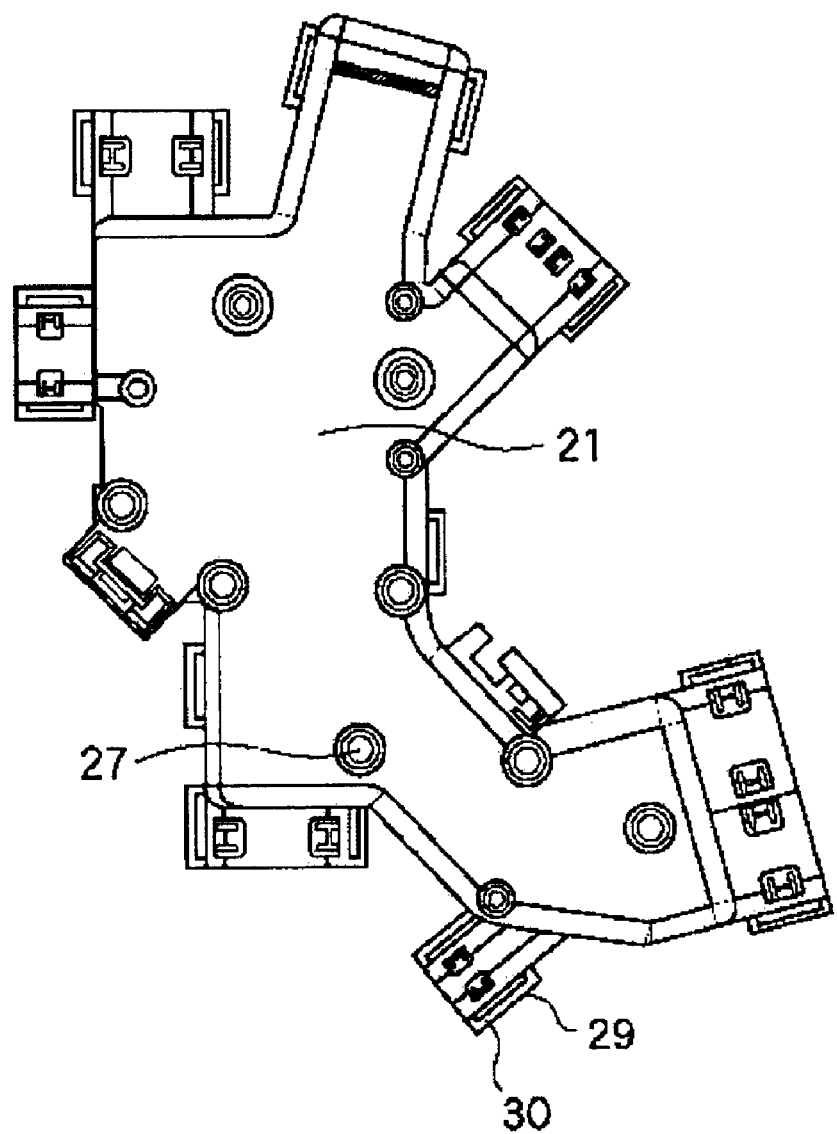
FIG. 4 is a bottom view of the protector body 20 of the first embodiment of the invention.
Figure 5:
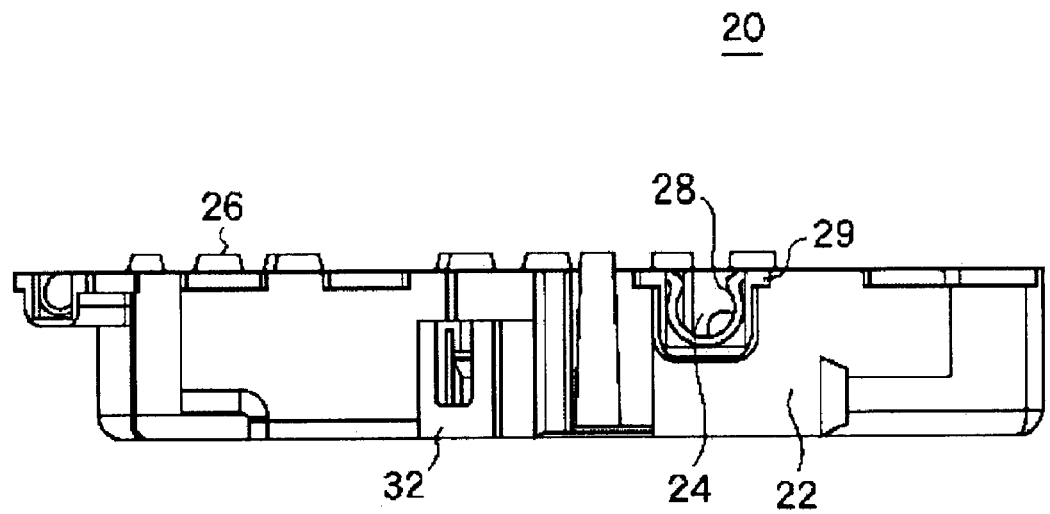
FIG. 5 is a side view of the protector body 20 of the first embodiment of the invention.

10a Wiring
11 Cylindrical cover
20 Protector body
21 Bottom section
22 Sidewall
23 Center section
24 Guide opening
25 Guide path
26 Boss
26a Downward sloping surface
27 Pin hole
28 Curved section
29 Protruding section
30 Attachment hole
31 Joint section
32 Vehicle-fastening lock
33 Wiring-support rib
34 Attachment tab
40 Cover
41 Center section
42 Guide opening
43 Guide path
44 Boss hole
45 Curved section
46 Attachment section
47 Triangular section
48 Hose fastening lock
49 Engagement rib
50 Jig
51 Jig pin
D1 Wrap amount

DESCRIPTION OF THE PREFERRED EMBODIMENTS

Embodiment 1

The protector 1 of a first embodiment of the invention will be explained based on the drawings.

As shown in FIG. 1, the protector 1 of this embodiment comprises a protector body 20 that stores the wire harness 10, and a cover 40 that closes off the top openings on the protector body 20.

As is shown in FIG. 1 to FIG. 5, the protector body 20 is made from a synthetic resin or plastic such as PP, and comprises: a bottom section 21, and a sidewall 22 that extends upward from the edge of the bottom section 21.

The bottom section 21 comprises: a center section 23, a plurality of guide openings 24 that guide the wire harness 1 0 to the outside of the protector 1, and a plurality of guide paths 25 that connect from the center section 23 to the guide openings 24. The center section 23 is formed with a plurality of bosses 26.

The bosses 26 are located in positions that correspond to the jig pins 51 of the jig 50, and for example, are arranged near the sidewall 22 or between the center section 23 and guide paths 25 (hereafter referred to as the division locations). The height of each of the bosses 26 is higher than the sidewall 22, and is high enough that when covered by the cover 40, they are inserted into the boss holes in the cover 40. The diameter of the bosses 26 is not fixed, and for example, can be set to different kinds (two kinds in this embodiment) according to the number of the contacting wire harnesses 10 or the bending angle of the wire harnesses 10.

Figure 6:
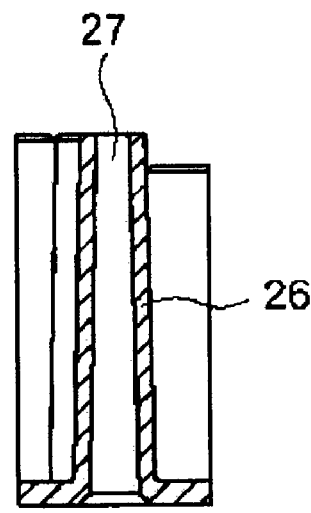
FIG. 6 is a cross-sectional view of the boss 26 of the first embodiment of the invention.
Figure 7:
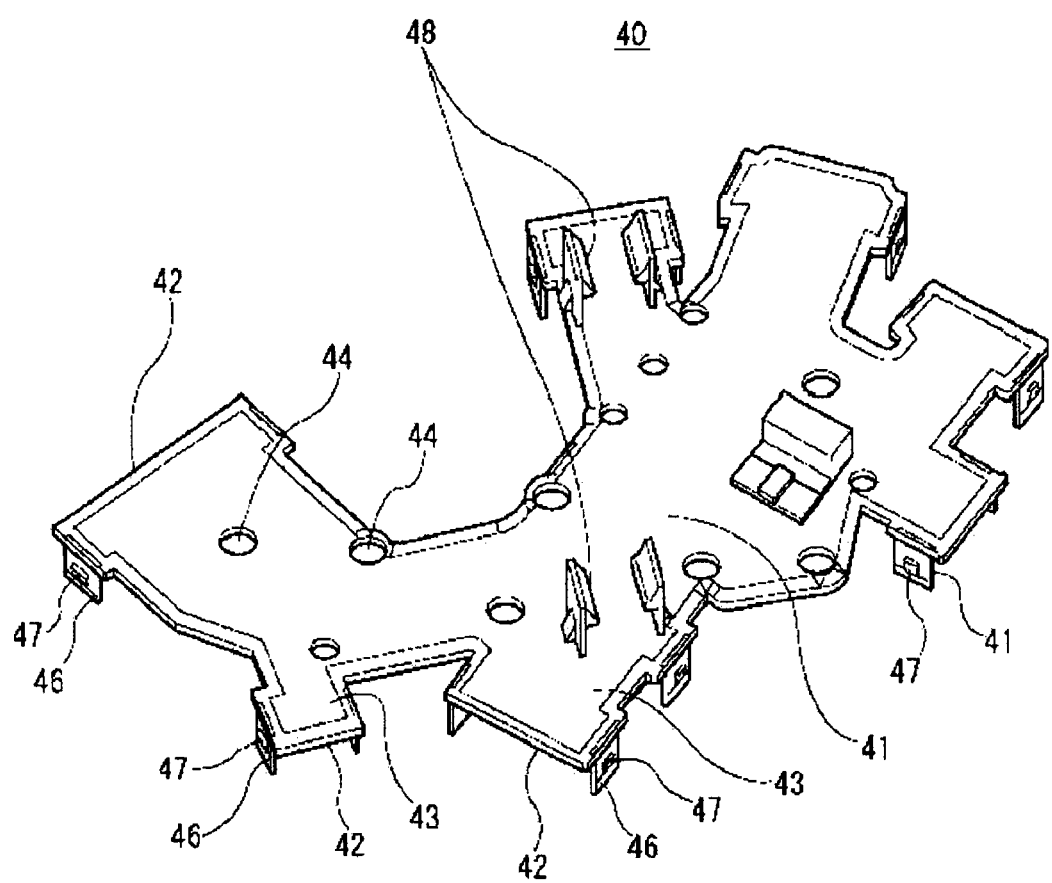
FIG. 7 is a pictorial view of the cover 40 of the first embodiment of the invention.
Figure 8:
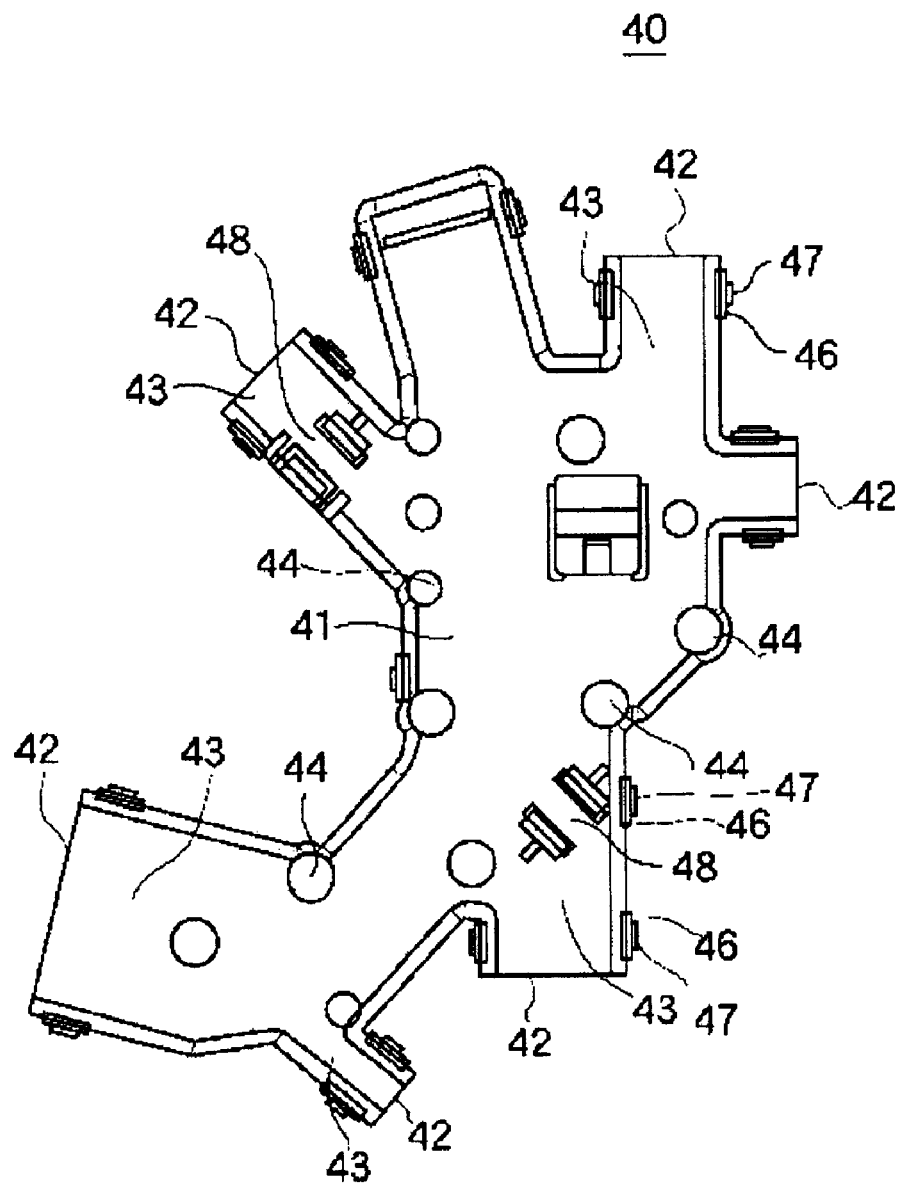
FIG. 8 is a top view of the cover 40 of the first embodiment of the invention.
Figure 9:
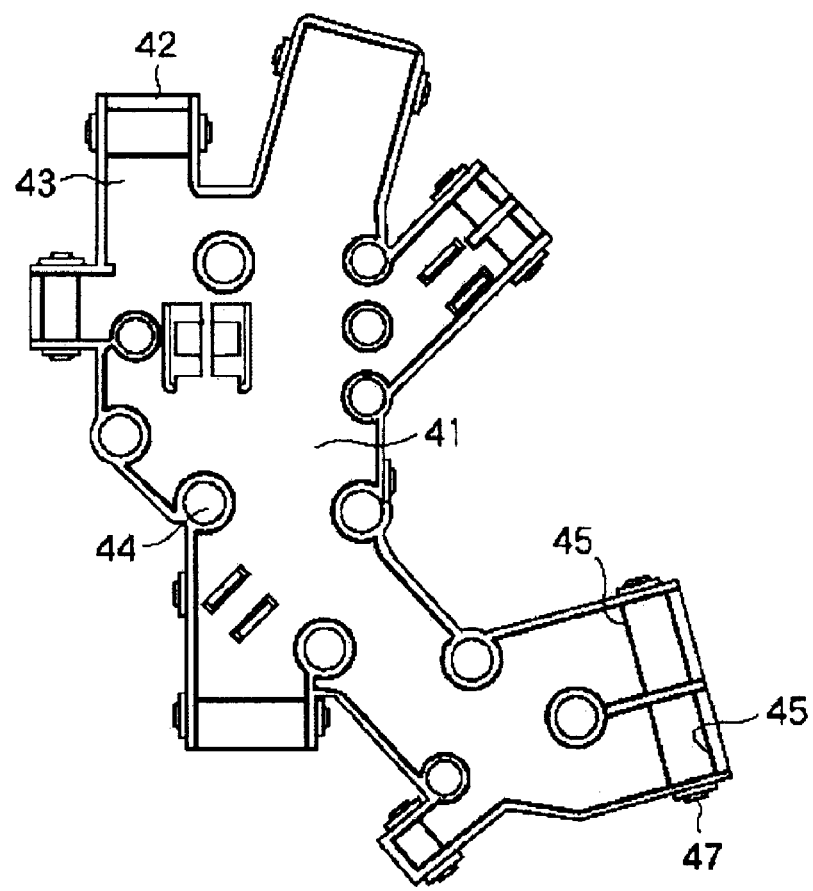
FIG. 9 is a bottom view of the cover 40 of the first embodiment of the invention.
Figure 10:
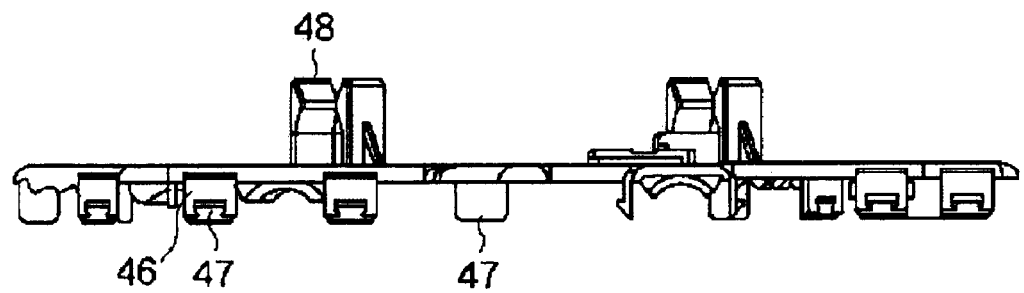
FIG. 10 is a side view of the cover 40 of the first embodiment of the invention.

As shown in FIG. 6, the bosses 26 are spindle shaped such that the cross-sectional area becomes smaller going from the bottom toward the top. The bosses 26 comprise pinholes 27 in which the jig pins 51 are inserted, and are circular shaped as seen from the cross section. The pinholes 27 are formed in the same shape as the outer shape of the bosses 26 such that the diameter becomes smaller going from the bottom toward the top, and the inner diameter (minimum diameter) at the very top section is formed such that it is the same as the diameter of the jig pin 51.

As is shown in FIG. 1 to FIG. 5, each of the guide openings 24, together with the sidewalls 22 formed on both sides of the bottom section 21, form a U-shaped cross section, and the inside is formed with curved sections 28. The curved section 28 is formed such that the top section is cut out in an arc shape to form a thin plate shape, and there are two curved sections 28 formed in each guide opening 24. The curved sections 28 are divided by the bosses 26, and the cross section of the outer surface secures the bottom section of the wire harness 10 bundle that is covered by a cylindrical cover 11 having a wave-shaped accordion fold.

Outward protruding sections 29 are formed in an outward protruding shape on the top end of the sidewalls 22 that are located on both sides of the guide openings 24, and attachment holes 30 are formed in the protruding sections 29. By inserting and fastening the attachment tabs located on the cover 40 in the attachment holes 30, the cover 40 is fastened to the protector body 20.

The guide paths 25 extend from the center section 23 to the guide openings 24, and are formed from the bottom section 21 and the sidewalls 22 that are formed on both sides of the bottom section 21 such that the cross section has a U shape.

Code number 31 is a joint section, and as shown in FIG. 1, the end sections are joined, and a plurality of wire harnesses 10 that are protected by waterproof caps are stored on the inside.

Locks 32 for fastening to a vehicle are formed on the outer surface of the sidewalls 22 of the protector body 20. The locks 32 for fastening to a vehicle are for fastening the protector 1 to a vehicle, and are constructed such that they can fit on the vehicle panel (not shown in the figures).

As shown in FIG. 7 to FIG. 10, the cover 40 is made out of the same synthetic resin or plastic as the protector body 20, and it comprises a center section 41, a plurality of guide openings 42, and a plurality of guide paths 43 that connect from the center section 41 to the guide openings 42.

Boss holes 44 are formed in the center section 41 at locations that correspond to the bosses 26. The boss holes 44 are formed such that they are larger than diameter on the top end of the bosses 26.

Curved sections 45 are formed in each of the guide openings 42 such that as seen from the vertical plane they have a plate shape of which the bottom is cut out into an arc shape. There are two curved sections 45 in each of the guide openings 42, and are formed in locations that correspond to the curved sections 28 of the protector body 20. The top section of a wire harness 10 bundle that is covered by a cylindrical cover 11 is held in place by the two curved sections 45. In other words, when the cover 40 is fastened to the protector body 20, the curved sections 28 and curved sections 45 form a circular opening, and the cylindrical cover 11 is held between the two aligned curved sections 28, 28 and 45, 45, and the wire harness 10 is fastened to the guide opening 24.

Attachment sections 46 are formed on both edges of each of the guide openings 42 in positions that correspond to the attachment holes 30 in the protector body 20. The attachment sections 46 are formed so that they protrude downwards, and triangular sections 47 are formed on the tip ends.

The triangular sections 47 are inserted into the attachment holes 30, and by fastening them to the attachment holes 30, the cover 40 is fastened to the protector body 20.

Hose fastening locks 48 are formed on the top surface of the cover 40. The hose fastening locks 48 are formed such that the two tab sections are integrated with the cover 40. Rubber hoses and pipes other than the wire harnesses 10 that are installed in the vehicle are inserted between the two tab sections, and the rubber hose or pipe is fastened to the cover 40 by the elastic force of these two tab sections.

Figure 11:
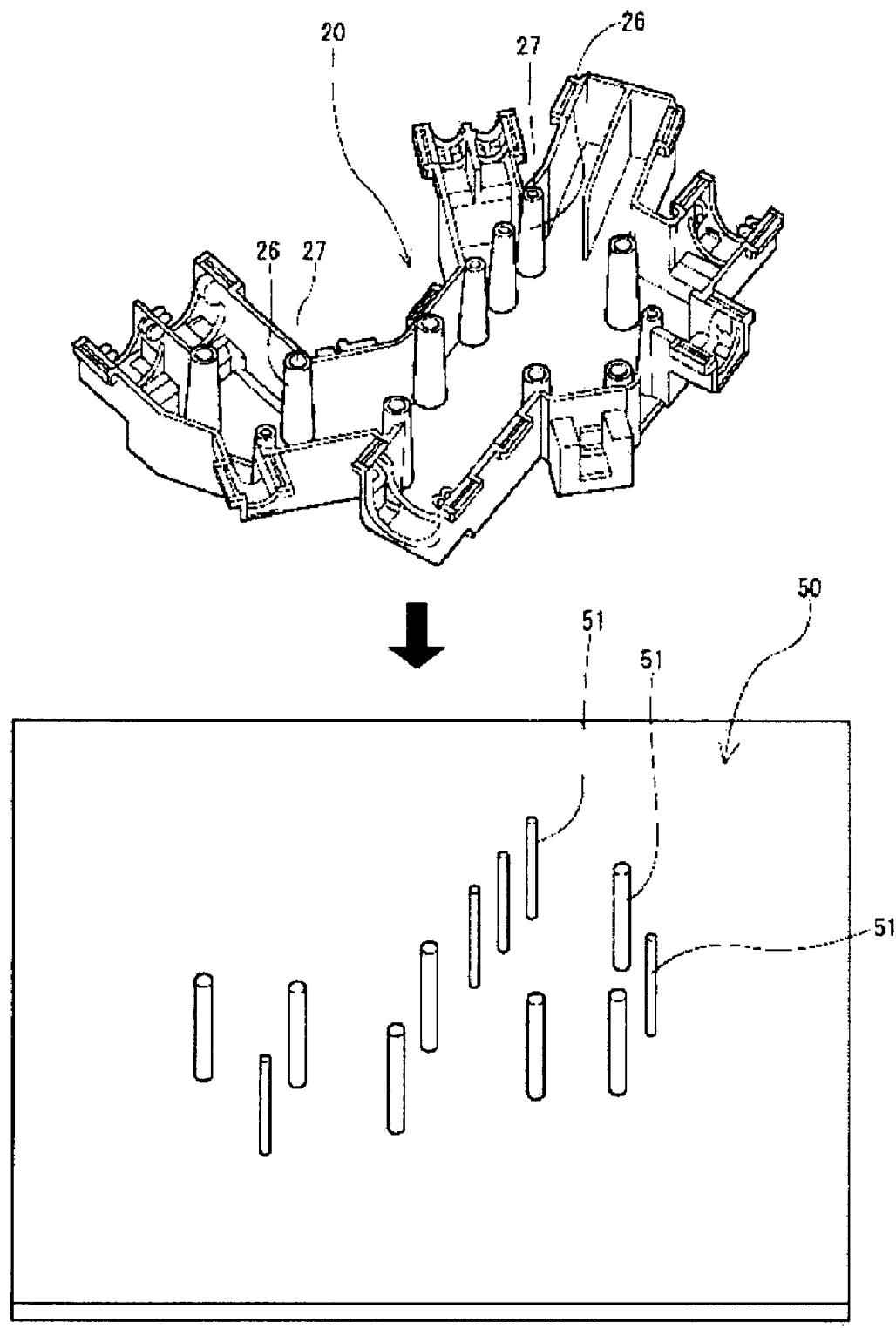
FIG. 11 is a drawing that explains the wiring method of the first embodiment of the invention.

As show in FIG. 11, the jig 50 secures the protector 1 and comprises: a base plate that is located in the wiring location of the wire harnesses 10, and a plurality of jig pins 51.

The jig pins 51 are located in positions that correspond with the bosses 26, and the protector 1 is secured by inserting the jig pins 51 into the boss holes. Similar to the bosses 26, the plurality of jig pins 51 have different diameters according to the number of divided wire harnesses 10.

Next, the method of wiring the wiring harnesses 10 that use the protector 1 of the first embodiment of the invention will be explained according to FIG. 11 and FIG. 12. The jig 50 has been omitted in FIG. 12.

First, as shown in FIG. 11, the protector body 20 is installed on the jig 50 that is placed at a specified location inside a vehicle, for example. When doing this, the jig pins 51 are lined up with the pinholes 27 in the bosses 26 in the protector body 20, and the jig pins 51 are inserted into the pinholes 27.

Figure 12:
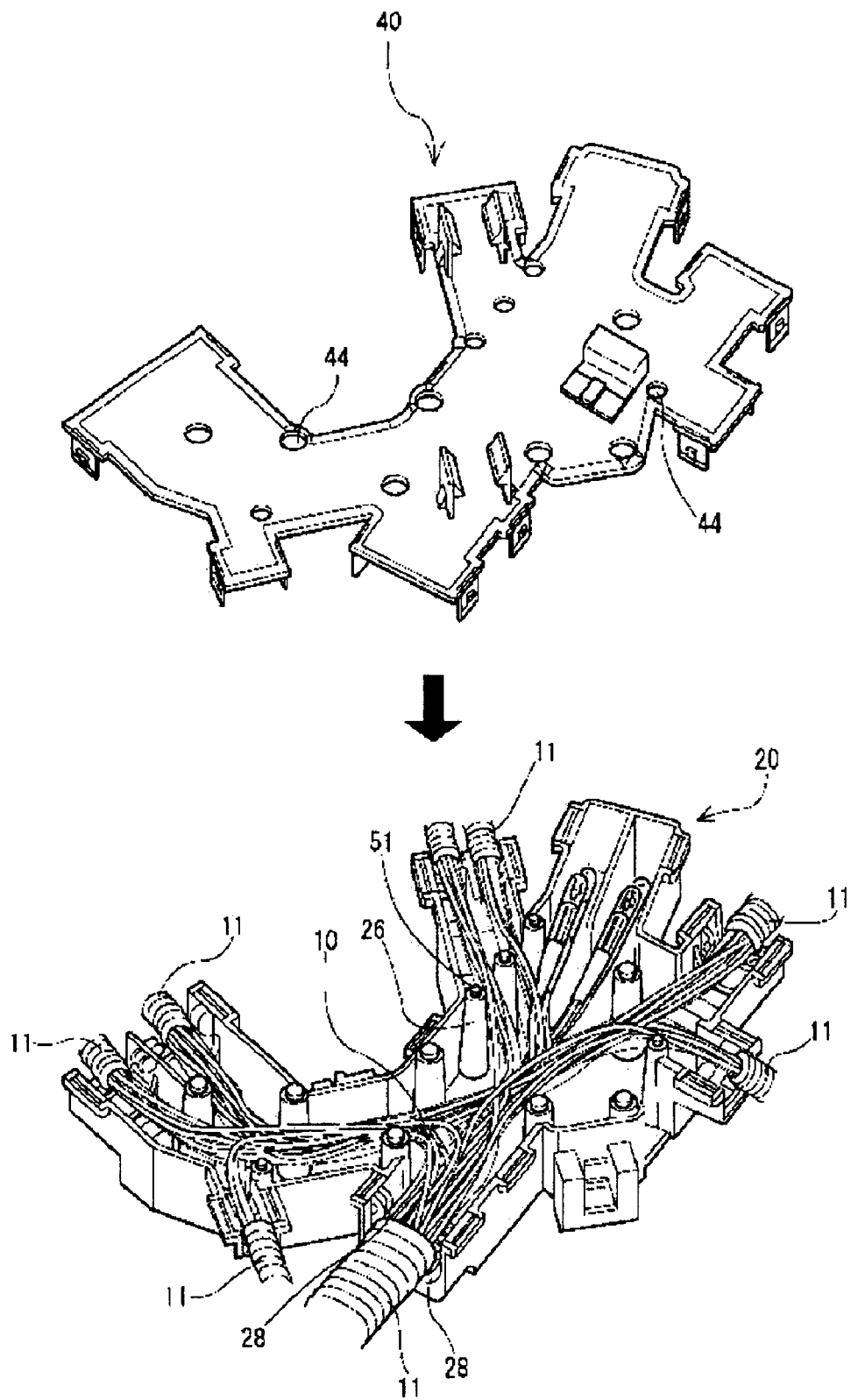
FIG. 12 is a drawing that explains the wiring method of the first embodiment of the invention.

Next, wiring of the wire harness 10 is performed as shown in FIG. 12. When doing this, when bending the wire harness 10, it is bent around a boss 26 and divided. Also, the wire harness 10 is guided by way of the guide paths 25 from the guide openings 24 to the outside of the protector 1.

Next, the cover 40 is put in place from the top. When doing this, the positions of the bosses 26 and boss holes are lined up, and the triangular sections 47 on the cover 40 are inserted into the attachment holes 30 of the protector 20, and by fastening the triangular sections 47 with the outward protruding sections 29, the cover 40 is fastened to the protector body 20.

As shown in FIG. 1, the wire harness 10 is protected by and wired inside the protector 1 at a specified location inside the vehicle.

The protector 1 of the embodiment described above has the following effect.

A conventional protector 1 was fastened by inserting jig pins 51 into holes that were formed in the protector body 20 and cover 40, so when the protector 1 was removed from the jig 50, the jig pins 51 were no longer inside the protector 1 and the wire harness 10 became loose inside the protector 1. Therefore, the wire harness 10 became loose along its length that was guided from the guide openings 24. However, with this embodiment, after wiring the wire harness 10, even though the protector 1 is removed from the jig 50, the position of the wire harness 10 is secured by the bosses 26 inside the protector 1, so the wire harness 10 does not become loose inside the protector body 20. Therefore, the wire harness 10 does not become loose along its length that is guided from the guide openings 24 of the protector 1.

By using bosses 26 in the place of the holes that were formed in the conventional protector body 20, it is possible to increase the dust-proof effect. In other words, in the conventional protector 1 in which holes were formed in the protector body 20, dust or water easily entered from outside the protector body 20 through the holes, however, by using bosses 26, it becomes more difficult to get inside.

The bosses 26 are arranged along the sidewalls 22, and by wiring the wire harness 10 on the inside of these, the wire harness 10 is not pinched by the cover 40 when installing the cover 40.

By forming bosses 26 having pin holes 27 in the protector body 20, and forming boss holes in the cover 40, the wire harness 10 located around the bosses 26 is not pinched when putting the cover 40 in place. In other words, in the case in which holes are formed in the protector body 20 and bosses 26 having pin holes 27 are formed in the cover 40, when installing the cover 40 with bosses 26 after the wire harness 10 has been wired, the wire harness 10 that is located around the holes in the protector body 20 comes in contact with the bosses 26, however, in this embodiment, when wiring, it is possible to avoid the bosses 26, so the wire harness 10 is not pinched when installing the cover 40.

Also, by setting the diameters of the bosses 26 to various sizes, it is possible to use bosses 26 having adequate strength to match the wiring state of the wire harness 10, and thus it is possible to prevent damage to the bosses 26 due to stress from the wire harness 10, and the bosses 26 do not take up unnecessary space.

Moreover, by forming the bosses 26 so that they are higher than the sidewalls 22, and by increasing the length of the pinholes 27, it is possible to securely secure them with the jig pins 51.

Furthermore, by forming the bosses 26 and pin holes 27 such that they have a spindle shape, it becomes easy to insert the pins, as well as it is possible to prevent spaces between them and the jig pins 51, and to maintain a good dust-proof effect.

By securing the wire harness 10, which is covered by an accordion-fold shaped cylindrical cover 11 that is secured by two curved sections 28, 28 and 45, 45 that are formed in the guide opening 24, it is possible to stably secure the wire harness 10 along its length from the guide opening 24 to the outside, and to prevent the wire harness 10 from becoming loose.

The present invention is not limited to the embodiment above, and it is evident that this embodiment could be suitably changed within the technical scope of the invention.

In the first embodiment described above, the thickness of the two kinds of bosses and jig pins 51 is set according to the number of wire harnesses 10, however, they can be changed to an appropriate size (any number of kinds) according to the number, thickness, bending angle and the like of the wire harness 10. Also, it is possible to keep the thickness of the jig pins 51 fixed, and suitably change the size of just the outer diameter of the bosses 26. It is the bosses 26 that receive the stress from the wire harness 10, so by making the pin holes 27 small and increasing the size of the diameter of the bosses 26, the thickness of the bosses 26 is increased so it is possible to better handle large stresses.

In this embodiment of the invention, the case of forming boss holes 44 in the cover 40 was explained, however, the invention can also be applied to a case in which boss holes 44 are not formed in the cover 40. In other words, it is possible to form the jig pins 51 and bosses 26 such that they just come in contact with the cover 40 when installing the cover 40, or are lower than that. In this case as well, by forming bosses 26 in the protector body 20, the same effect as described above of the wire harness 10 not becoming loose inside the protector 1 when removed from the jig 50 is obtained. Furthermore, it is possible to prevent water or dust from getting inside from the top.

Also, by lining the inside surface of the boss holes in the cover with a flexible material such as rubber, it is possible to further improve the dust-proof effect.

Figure 13:
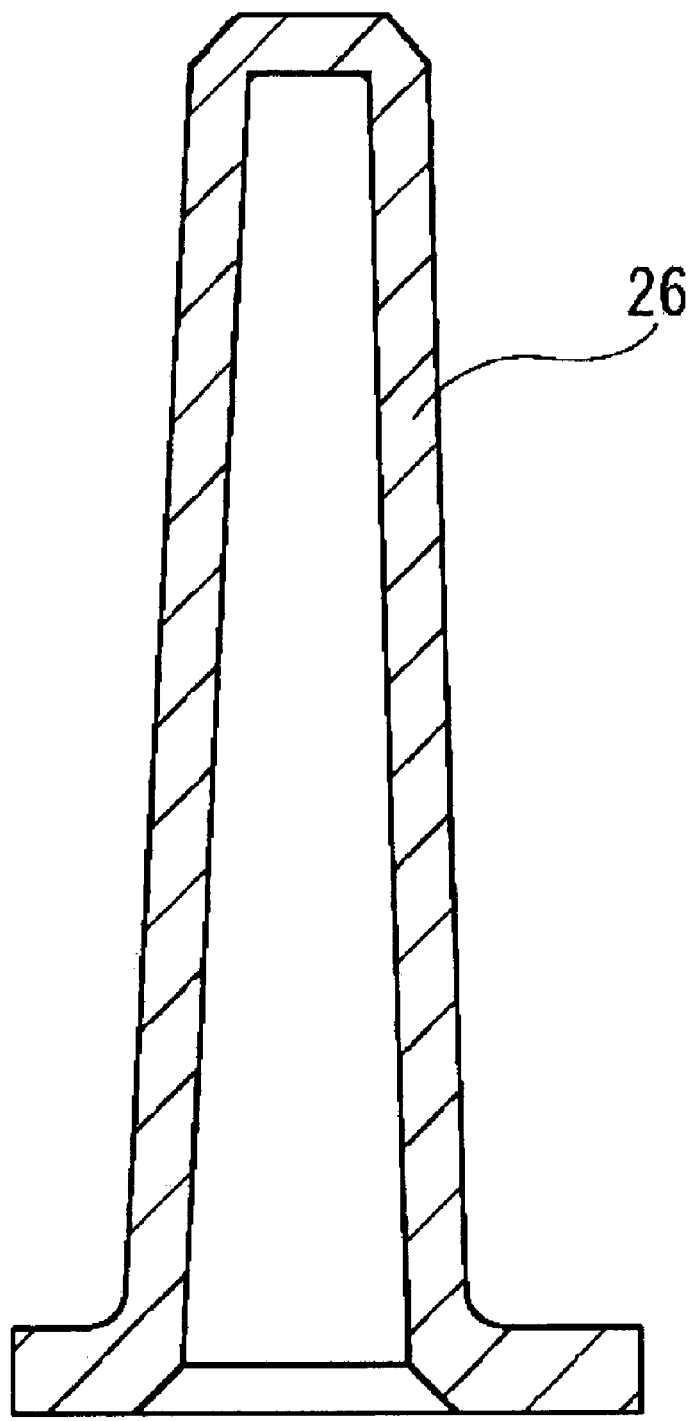
FIG. 13 is a cross-sectional drawing that shows an example of changes to the boss 26 of the first embodiment of the invention.

In the embodiment described above, bosses 26 having pin holes 27 were explained, however, as shown in FIG. 13, by securing the protector body 20 to the jig 50 by a section other than jig pins 51, it is possible to do away with the pin holes 27.

Embodiment 2

The protector 1 of a second embodiment of the invention will be explained based on the drawings.

Figure 14:
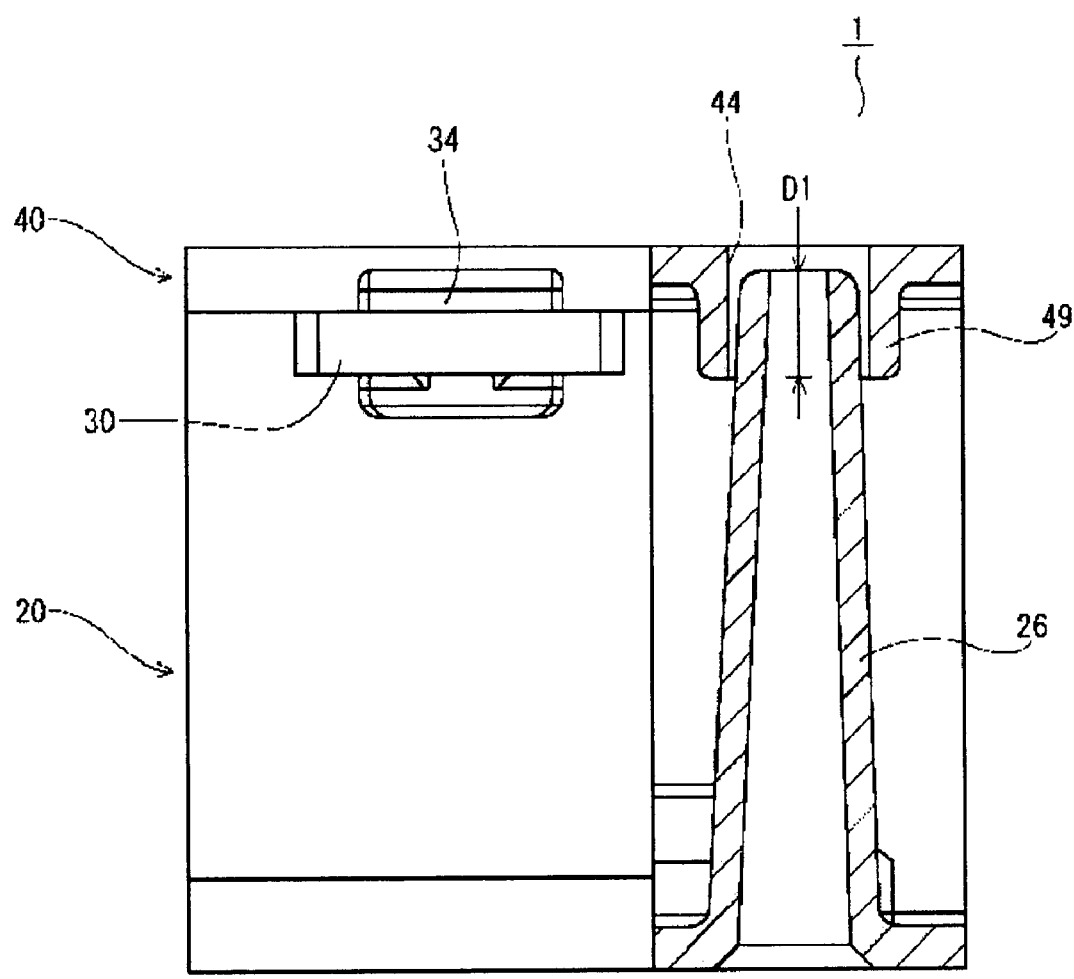
FIG. 14 is a front cross-sectional view showing the state of the cover 40 attached to the protector body 20 of the protector 1 of a second embodiment of the invention.

As shown in FIG. 14, in the protector 1 of this embodiment, there is an engagement rib 49 located around the boss holes 44 of the cover 40 so as to face the bosses 26, and the amount of wrap D1 between this engagement rib 49 and the boss 26 exceeds the allowable fastening amount when installing the cover 40 on the protector body 20. As a result, in the case that the wiring 10a of the wire harness 10 becomes pinched between the boss 26 and the engagement rib 49, it is not possible to lock the cover 40 onto the protector body 20, so it makes it easy to notice that the wiring 10a is pinched.

Figure 16:
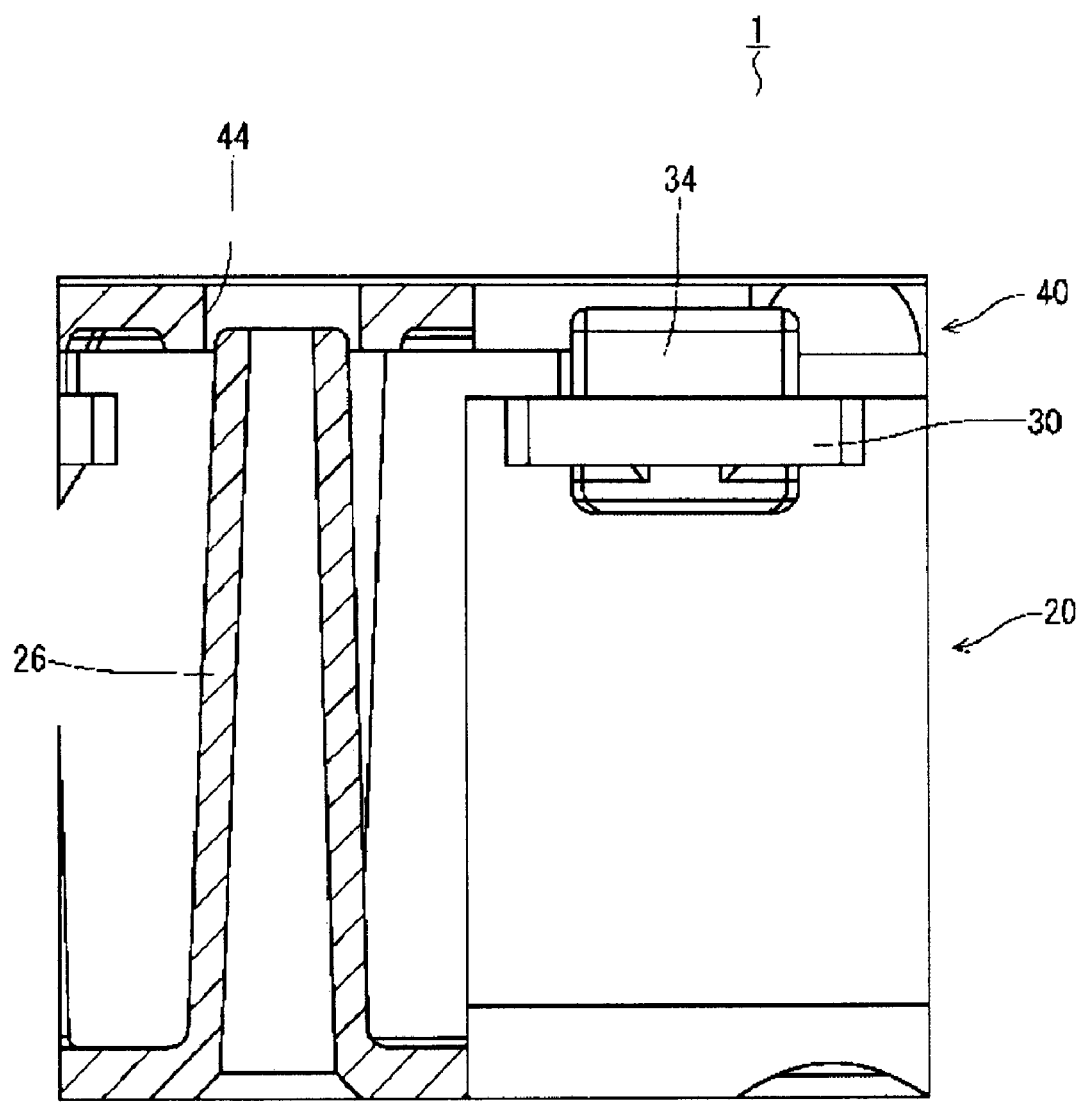
FIG. 16 is a front cross-sectional view showing the state of the cover 40 attached to the protector body 20 when there is small amount of boss 26 wrap.
Figure 17:
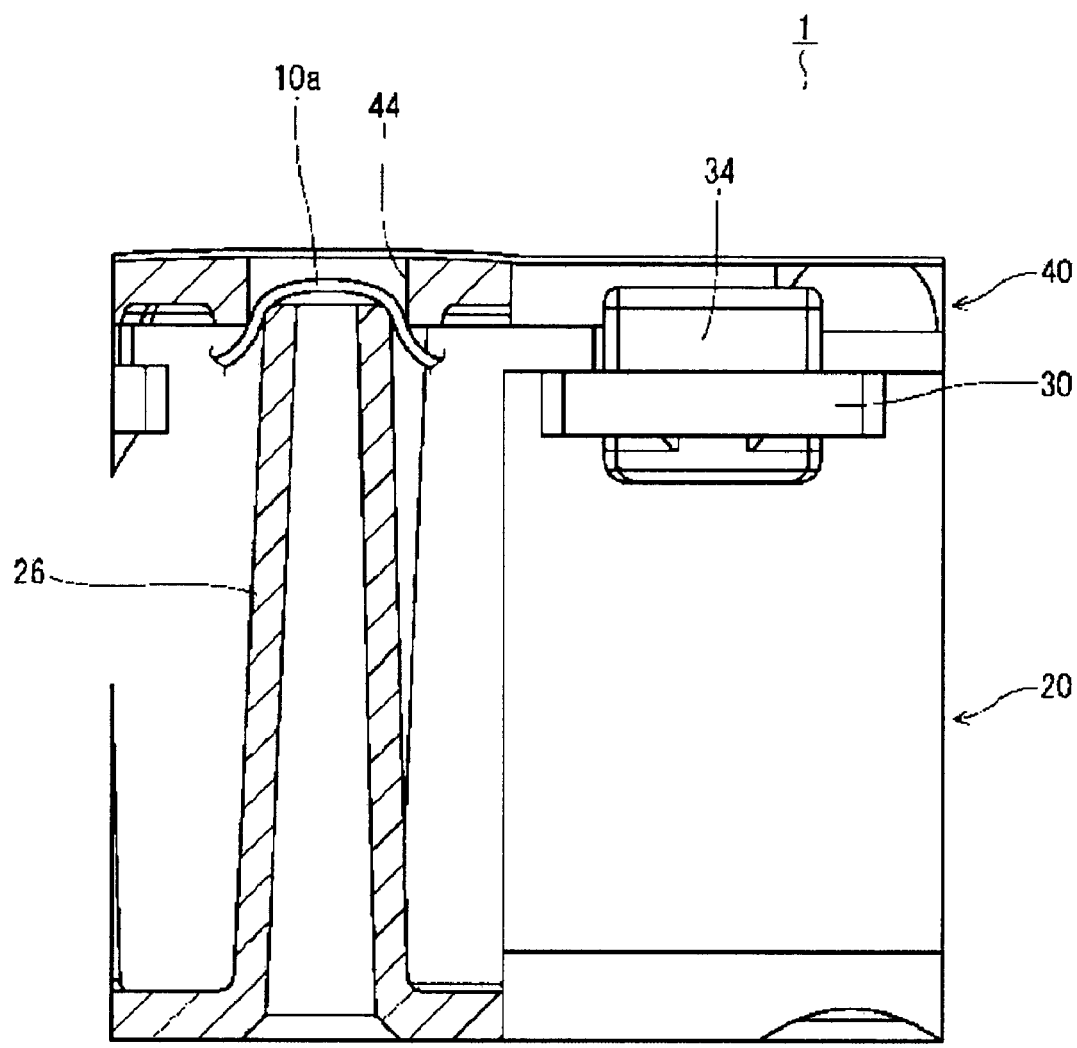
FIG. 17 is a front cross-sectional view showing the pinched state of the wire in FIG. 16.

In other words, as shown in FIG. 16, when there are no engagement ribs 49, there is hardly any wrap between the boss 26 and boss hole 44, so even when the wiring 10a of the wire harness 10 becomes pinched between the boss 26 and the engagement rib 49, then as shown in FIG. 17, if the cover 40 is pressed a little, the attachment tab 34 of the cover 40 will be inserted into the attachment hole 30 and fasten, and the cover 40 will be locked to the protector body 20. Therefore, it is difficult to notice when the wiring 10a has become pinched.

Figure 15:
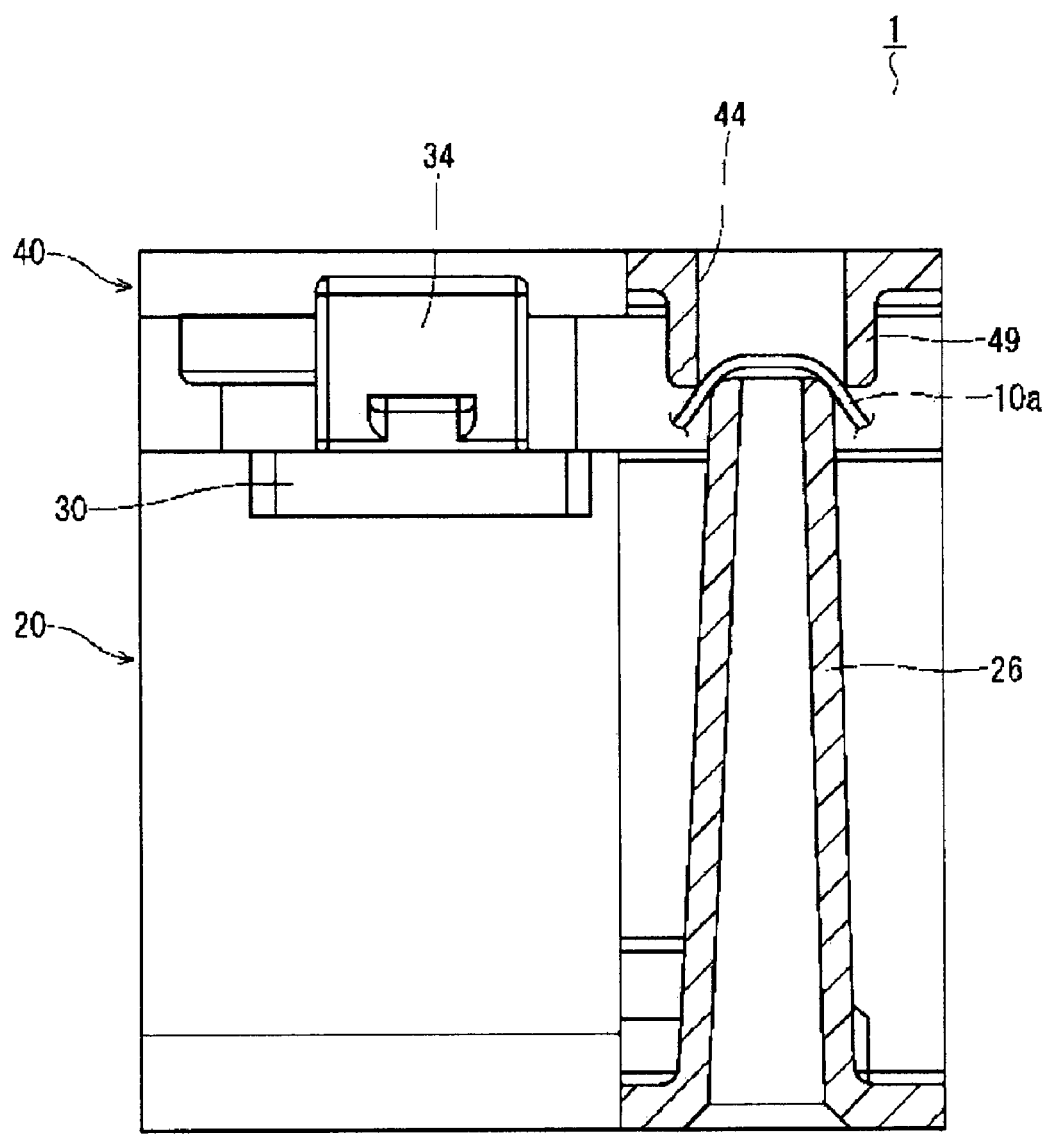
FIG. 15 is a front cross-sectional view showing the pinched state of the wire in FIG. 14.

On the other hand, in this embodiment, since the amount of wrap D1 between the engagement rib 49 and the boss 26 exceeds the allowable fastening amount, then as shown in FIG. 15, when the wiring 10a of the wire harness 10 becomes pinched between the boss 26 and the engagement rib 49, the attachment tab 34 on the cover 40 cannot be inserted and fastened even though the cover 40 is pressed. Therefore, it is not possible to lock the cover 40 onto the protector body 20, and it is possible to easily notice when there is pinched wiring 10a.

Embodiment 3

The protector 1 of a third embodiment of the invention will be explained based on the drawings.

Figure 18:
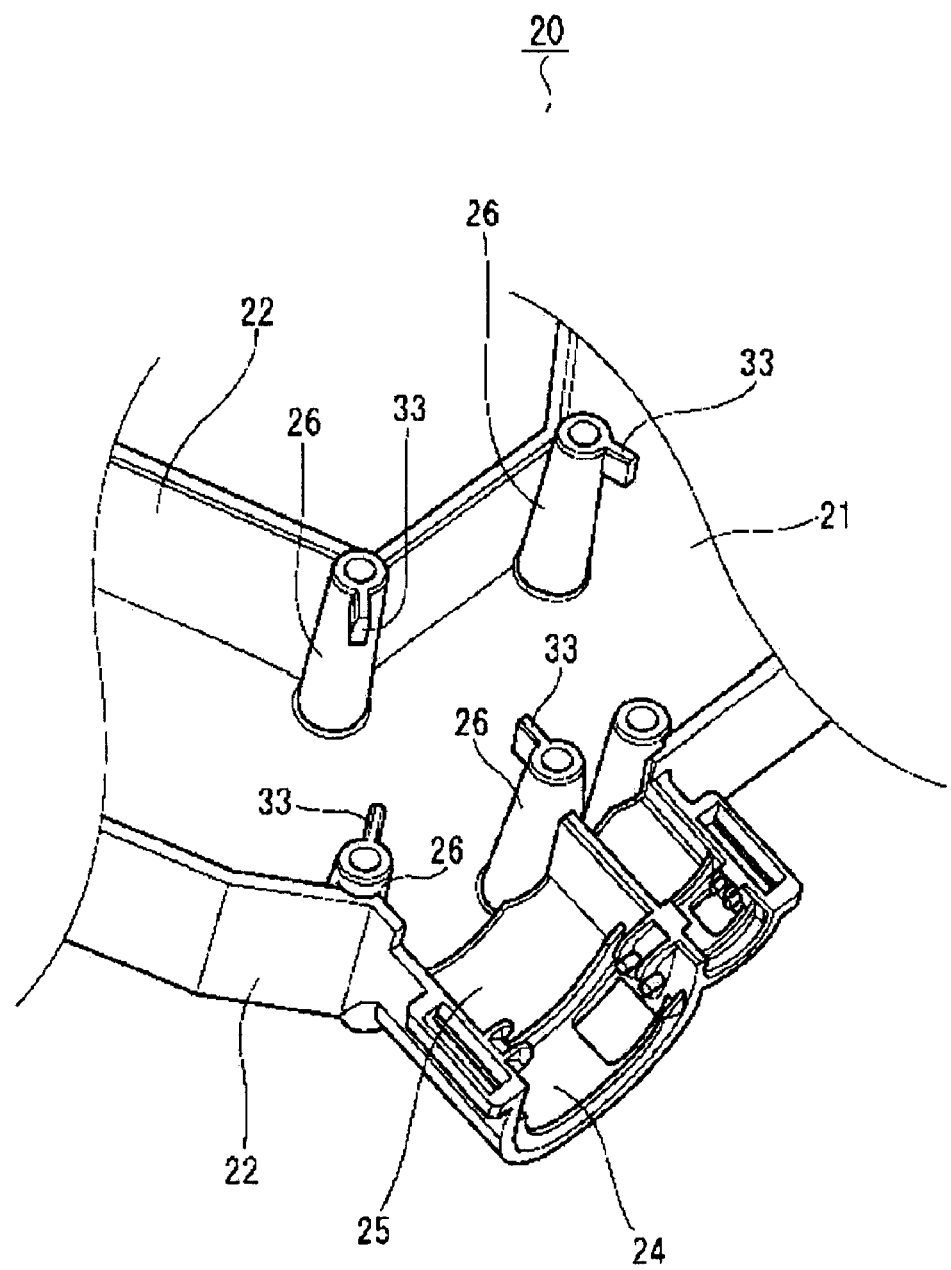
FIG. 18 is a pictorial drawing of the protector body 20 of a third embodiment of the invention.

As shown in FIG. 18, in the protector 1 of this embodiment wiring-support ribs 33 are formed near the top end of the bosses 26 that are arranged along the sidewalls 22 of the protector body 20 so that they are horizontal and face the opposite direction from the sidewalls 22. As a result, by placing the wiring of the wire harness underneath the wiring-support ribs 33, the wiring-support ribs 33 prevent the wiring from floating, and thus prevent the wiring from becoming pinched.

Figure 19:
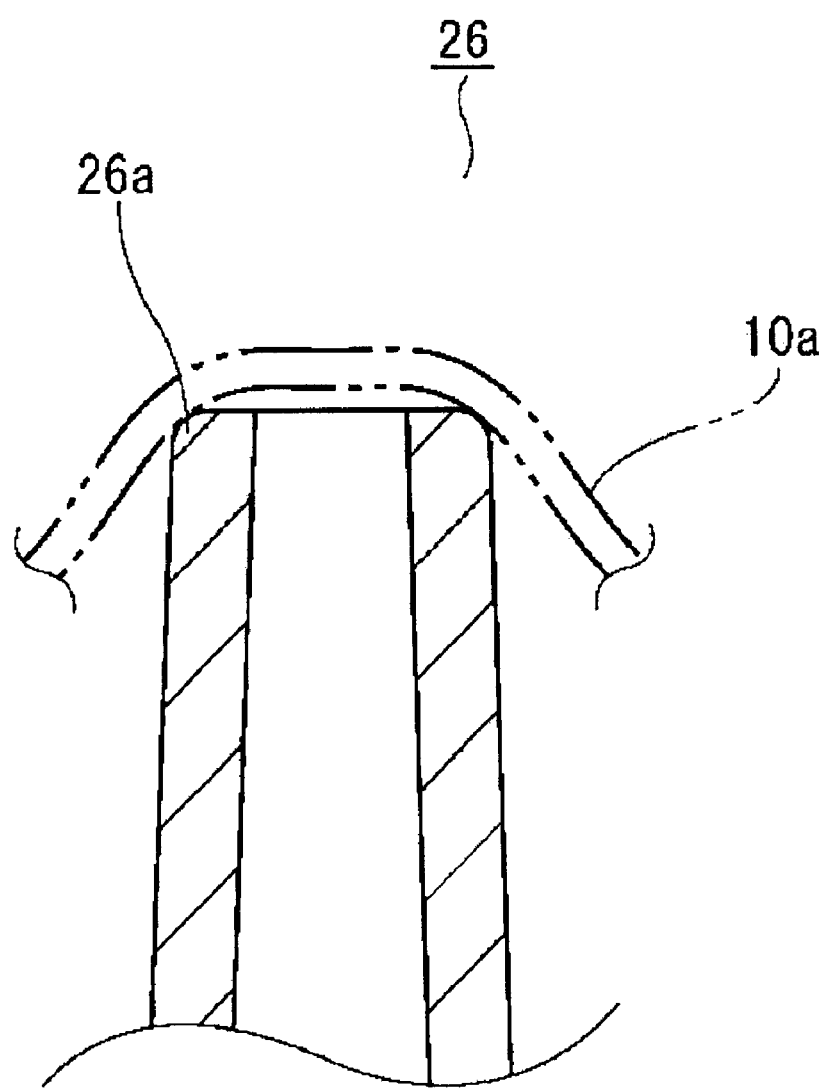
FIG. 19 is a cross-sectional view of the boss 26 of the protector body 20 shown in FIG. 18.
Figure 20:
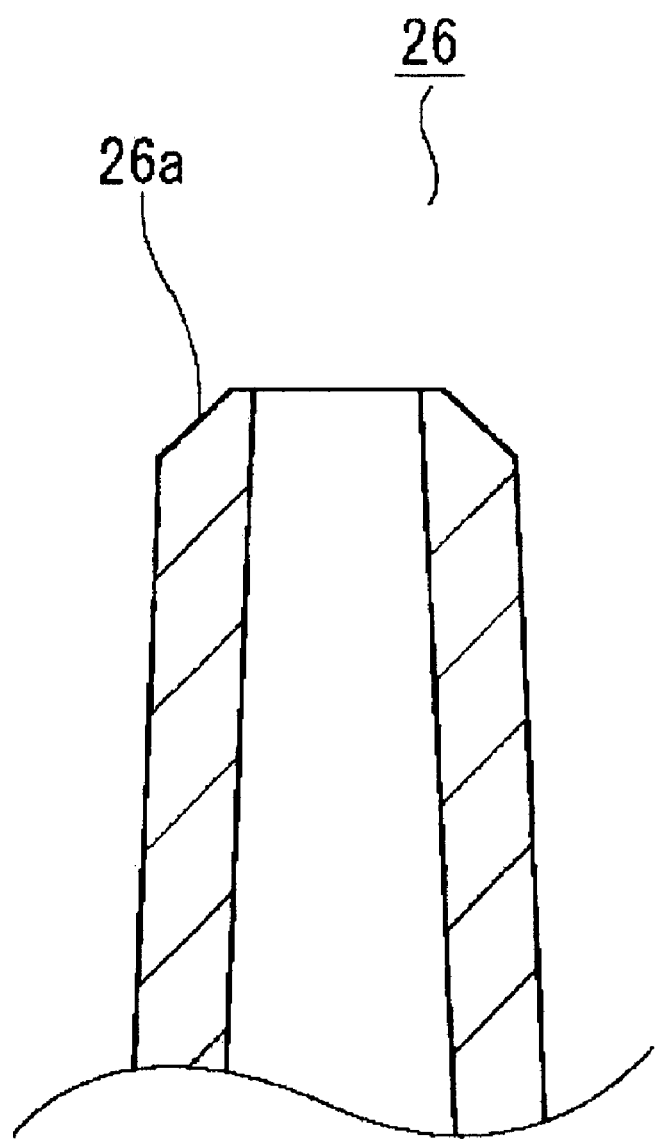
FIG. 20 is a cross-sectional view showing another example of the boss 26.

Also, as shown in FIG. 19, a downward sloping surface 26a having an arc-shaped cross section is formed on the top of the boss 26, and a lubricant is applied to it to improve its smoothness. Therefore, as shown by the imaginary line in FIG. 19, even when the wiring 10a of the wire harness 10 is placed on top of the boss 26, the wiring 10a easily slips off, which assists in preventing the wiring 10a from becoming pinched. Instead of the arc-shaped downward sloping surface 26a, it is also possible to form a tapered downward sloping surface 26a as shown in FIG. 20.

Embodiment 4

The protector 1 of a fourth embodiment of the invention will be explained based on the drawings.

Figure 21:
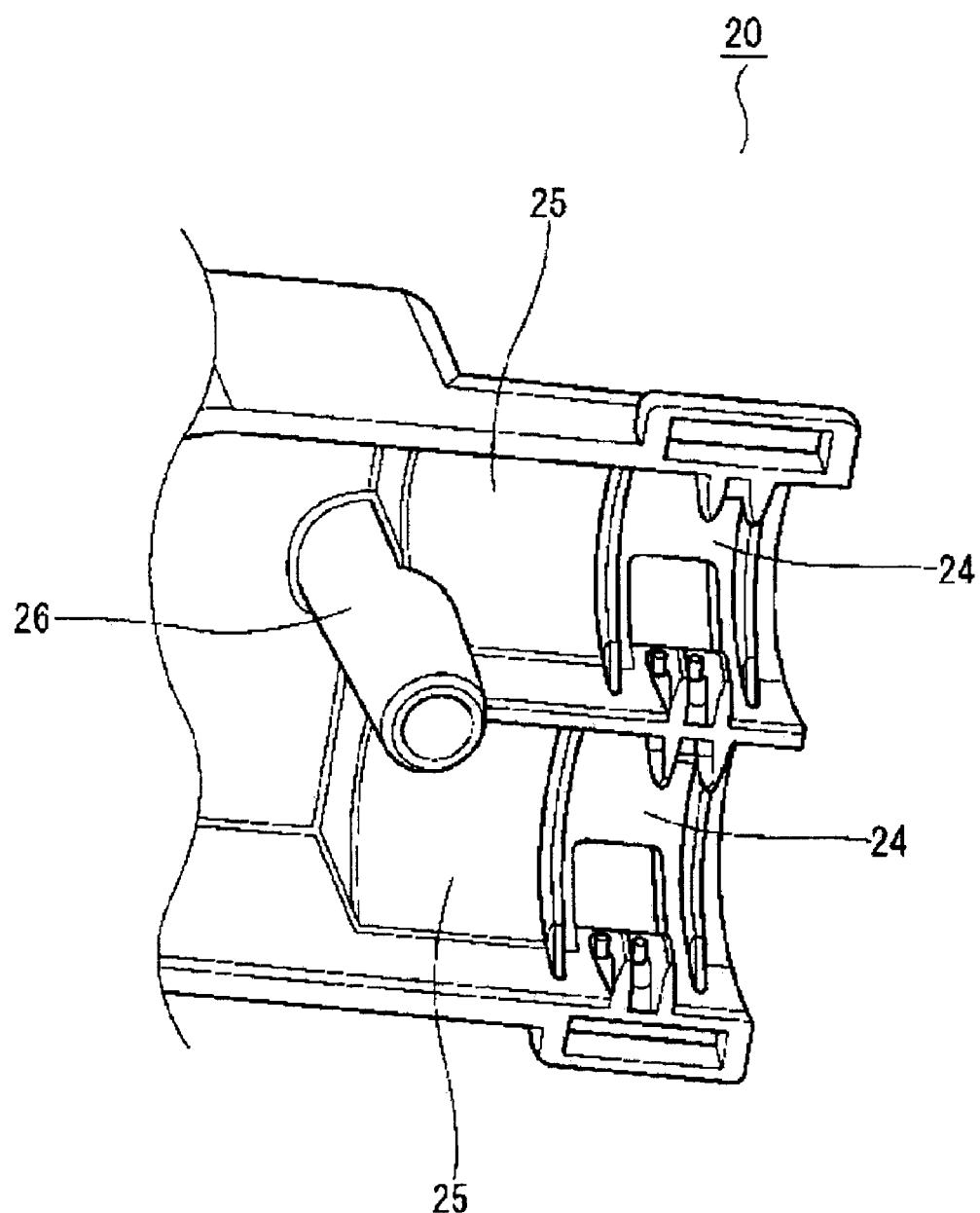
FIG. 21 is a pictorial drawing of the protector body 20 of a fourth embodiment of the invention.
Figure 22:
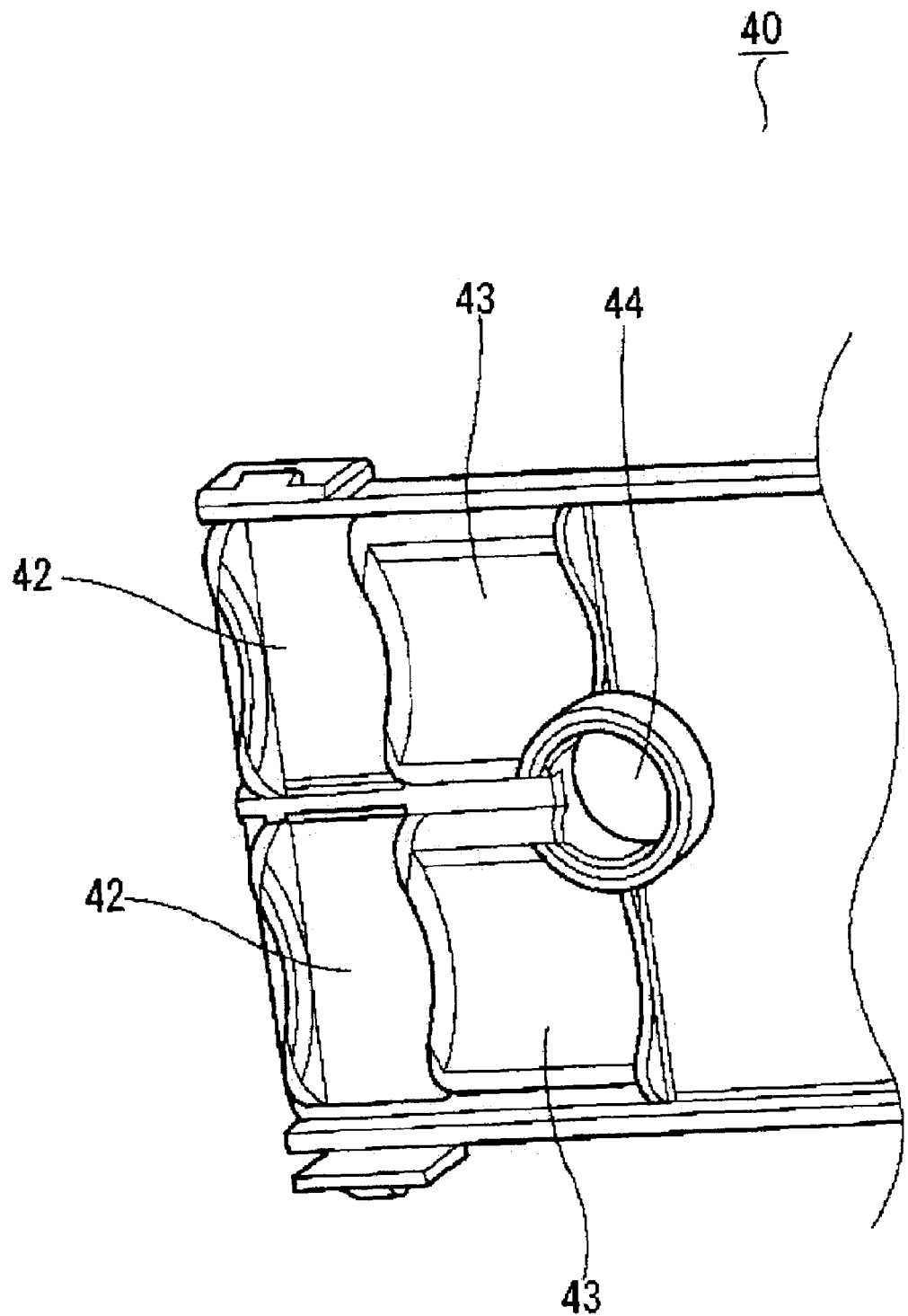
FIG. 22 is a pictorial drawing of the cover 40 of the fourth embodiment of the invention.

As shown in FIG. 21, in the protector 1 of this embodiment, the guide paths 25 in the protector body 20 are formed in a curved shape that corresponds to the outer surface of the accordion-fold shaped cylindrical cover 11 that covers the wire harness 10. Also, as shown in FIG. 22, the guide path 43 in the cover 40 is formed in a curved shape that corresponds to the outer surface of the accordion-fold shaped cylindrical cover 11 that covers the wire harness 10. As a result, when the cover 40 is installed onto the protector body 20, in addition to being able to control shifting (horizontal shifting) of the cylindrical cover 11 and wire harness 10, it is possible to prevent the wiring 10a of the wire harness 10 from coming out of the cylindrical cover 11.

Figure 24:
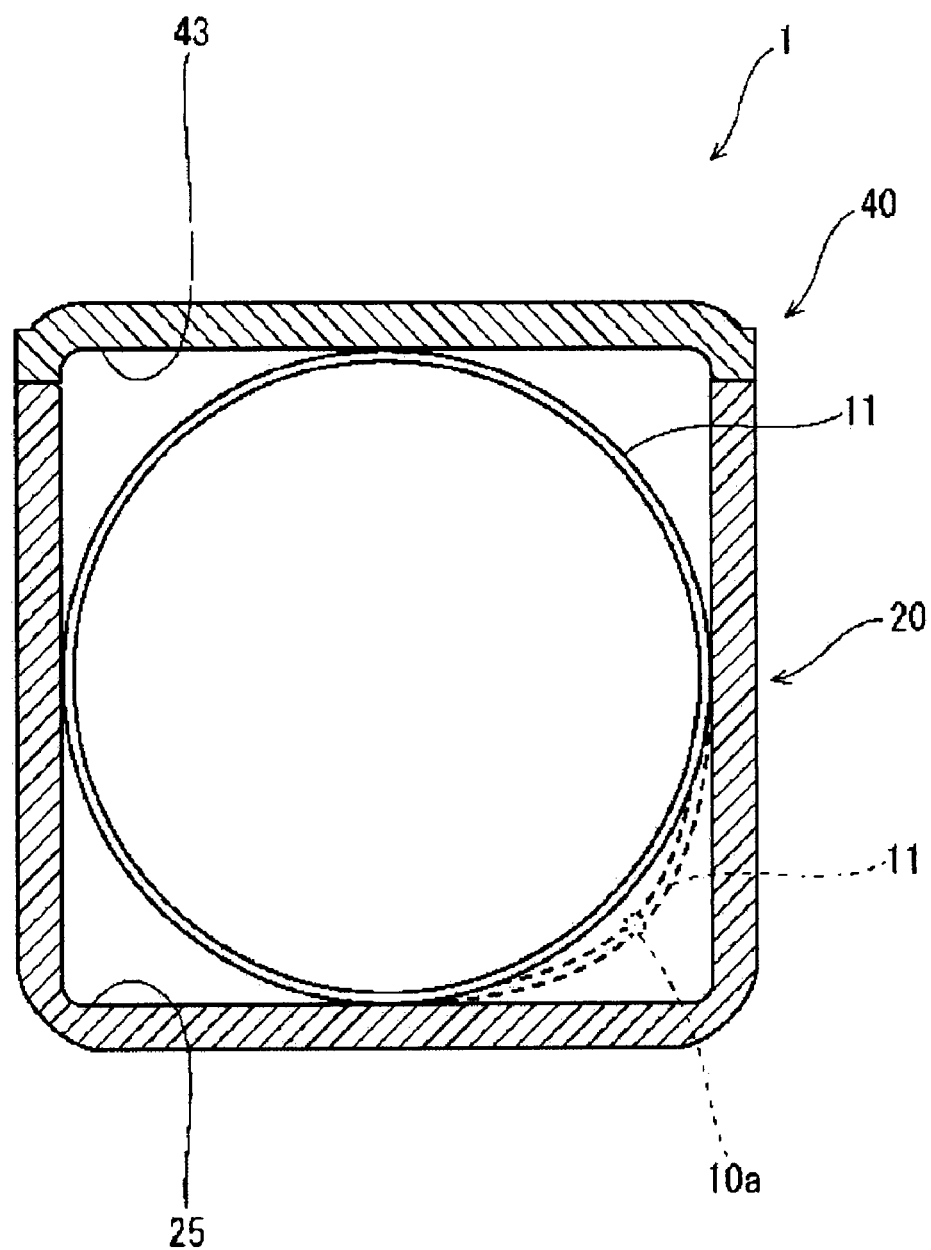
FIG. 24 is a cross-sectional drawing showing the state of the cover 40 attached to the protector body 20 when the guide path is flat.

In other words, in the case where the guide paths 25 in the protector body 20 and the guide paths 43 in the cover 40 are flat, then as shown in FIG. 24, even when the cover 40 is installed onto the protector body 20, a space exists between the cylindrical cover 11 and the protector body 20 and cover 40, so as shown by the dotted lines in FIG. 24, there is a danger that a slit in the cylindrical cover 11 will open and that the wiring 10a of the wire harness 10 will move from the inside to the outside of the cylindrical cover 11.

Figure 23:
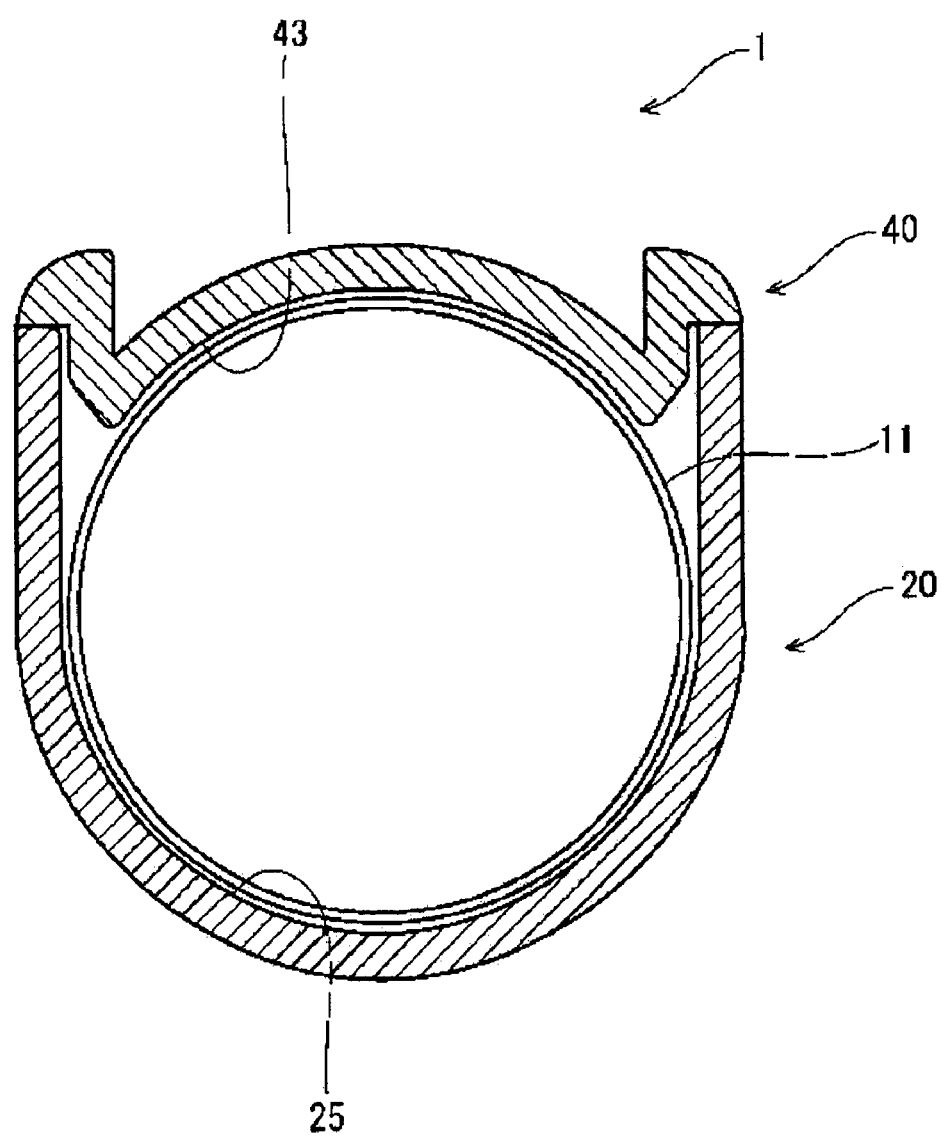
FIG. 23 is a cross-sectional drawing showing the state of the cover 40 attached to the protector body 20 of the protector of the fourth embodiment of the invention.

On the other hand, as shown in FIG. 23, with this embodiment, there is hardly any space between the cylindrical cover 11 and the protector body 20 and cover 40, so it is possible to prevent the wiring 10a of the wire harness 10 from accidentally coming out of the cylindrical cover 11.

INDUSTRIAL APPLICABILITY

This invention can be applied to a wide variety of industrial fields such as in automobiles, aircraft, trains, manufacturing plants, electrical appliances, office equipment and the like.

What is claimed is:

1. A protector adapted to engage a jig having at least one jig pin, comprising:
   a protector body that stores a plurality of wire harnesses, and a cover that closes off an opening section of the protector body wherein said protector body and said cover are used for wiring said plurality of wiring harnesses;
   at least one boss for positioning said wire harnesses is formed in said protector body;
   said wire harnesses being bent around the at least one boss and divided from the at least one boss;
   said at least one boss formed in said protector body in a position that corresponds to a position of said jig pins; and
   said at least one boss having a pinhole formed therein, said pinhole adapted to receive a jig pin;
   whereby removal of a jig pin from said at least one boss does not affect the wire harness bent around said at least one boss.

2. The protector of claim 1, further comprising:
   at least one engagement formed in said cover so as to face said at least one boss;

and an amount of wrap between said at least one boss and said at least one engagement rib exceeding the allowable fastening amount when installing said cover onto said protector body.

3. The protector of claim 1, further comprising:
at least one wiring support formed near a top end of said at least one boss.

4. The protector of claim 1, further comprising:
at least one downward sloping surface having an arc-shaped cross section formed on respective top sections of said at least one boss.

5. The protector of claim 1, further comprising:
lubricant applied to respective top sections of said boss at least one boss.

6. The protector of claim 1, further comprising:
at least one downward sloping surface having a taper-shaped cross section formed on respective top sections of said at least one boss.

* * * * *